United States Patent
Prabhakar et al.

(10) Patent No.: US 12,430,277 B2
(45) Date of Patent: Sep. 30, 2025

(54) HIGHLY SCALABLE ARCHITECTURE FOR PCIe GEN6 PROTOCOL ANALYSIS USING HIGH SPEED FPGA

(71) Applicant: PRODIGY TECHNOVATIONS PVT. LTD., Karnataka (IN)

(72) Inventors: Prajeesh Prabhakar, Bengaluru (IN); Mahammad Zakioddin, Bengaluru (IN); Aditya Mukundbhai Upadhyay, Bengaluru (IN); Sudarshan Shenoy Mulki, Bengaluru (IN); Abi Varghese, Bengaluru (IN); Brijesh Amarshibhai Chandrala, Bengaluru (IN)

(73) Assignee: PRODIGY TECHNOVATIONS PVT. LTD. (IN)

( * ) Notice: Subject to any disclaimer, the term of this patent is extended or adjusted under 35 U.S.C. 154(b) by 116 days.

(21) Appl. No.: 18/369,795

(22) Filed: Sep. 18, 2023

(65) Prior Publication Data
US 2025/0045236 A1    Feb. 6, 2025

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ............... G06F 13/4221; G06F 2213/0026
See application file for complete search history.

(56) References Cited

U.S. PATENT DOCUMENTS

| | | |
|---|---|---|
| 6,862,647 B1 * | 3/2005 | Hewitt ............... G06F 11/221 710/305 |
| 2007/0248018 A1 * | 10/2007 | Ranallo ............... H04L 43/18 714/E11.161 |
| 2020/0192850 A1 * | 6/2020 | Caruk ................... G06F 13/22 |

OTHER PUBLICATIONS

IN Office Action dated Jun. 7, 2024 in application 202341052554.

* cited by examiner

*Primary Examiner* — Henry Tsai
*Assistant Examiner* — Kim T Huynh

(57) ABSTRACT

The disclosed protocol analyser (100) decodes and analyse PCIe signals between a host node (102) and a device node (104), the signals being routed through an interposer (106). The analyser comprises at least a pair of high data rate 1:3 fanout buffers (108). The signals from the interposer are fed to the buffers (108) to obtain three copies of the signals. Three transceivers (110a, 110b, 110c) receive the signals from the fanout buffers and each of them samples one of the three copies of the signals. A link training and status state machine decoder (112) detects a speed or a change in speed in the PCIe signals. Based on the detected speed it selects one of the tapped signals, for protocol decoding and analysis. A protocol analyser logic block (114) analyses one of the copies of the signals conforming to the relevant PCIe protocols, from Gen1 to Gen6.

11 Claims, 3 Drawing Sheets

HIGHLY SCALABLE ARCHITECTURE FOR PCIe GEN6 PROTOCOL ANALYSIS USING HIGH SPEED FPGA

FIELD OF TECHNOLOGY

The present invention relates to the field of data communication and, more particularly, relates to Peripheral Component Interconnect Express (PCIe) protocol analysers.

BACKGROUND

Peripheral Component Interconnect Express (PCIe) is a high-performance, general-purpose input/output (I/O) interconnect protocol defined for a wide variety of computing and communication applications. It is conventionally used to connect non-core components of a general-purpose computer, for example, such as graphics card, memory, audio cards, etc., to the motherboard. Recently, the use of PCIe in high data rate applications such as cloud network storage servers and onboard cache coherent communications is seeing wide acceptance and this trend may be expected to continue in the future due to the introduction of high-speed communication standards such as 5G wireless communication and the ecosystem expected to be built around it.

PCIe standards are developed by Peripheral Component Interconnect-Special Interest Group (PCI-SIG) and are available for multiple speeds known as different generations. PCIe Gen1, Gen2, Gen3, Gen4, Gen5, and Gen6 support 2.5 GT/s, 5 GT/s, 8 GT/s, 16 GT/s, 32 GT/s, and 64 GT/s speeds respectively where GT/s stands for giga transfers per second.

Since PCIe uses a mix of multiple and non-multiple line rates (Gen1 at 2.5 GT/s, Gen2 at 5 GT/s, Gen3 at 8 GT/s, Gen4 at 16 GT/s, Gen5 at 32 GT/s and Gen6 at 64 GT/s) and non-return-to-zero (NRZ-Gen1 to Gen5) and Pulse Amplitude Modulation 4-level (PAM-4-Gen6) encoding schemes, it is not easy to design a protocol analyser which can analyze data at all these line rates by automatically adjusting the sampling rate unless a custom PCIe PHY chip is used.

The problem with PCIe PHY chips is that they are not readily available like other commonly available controllers since they are normally integrated in the PCIe root complex (RC), switch, and End Point (EP) controllers, for example, and not fabricated separately. If PCIe physical layer (PHY) chip is needed as a standalone chip, it needs to be fabricated after licensing PCIe PHY Intellectual Property (IP) from IP vendors and it is investment intensive. Therefore, fabricating the PCIe PHY chip as standalone product is not feasible and the cost of such PCIe PHY chip is not affordable.

SUMMARY

This summary is provided to introduce a selection of concepts in a simple manner that is further described in the detailed description of the disclosure. This summary is not intended to identify key or essential inventive concepts of the subject matter nor is it intended to determine the scope of the disclosure.

Thus, with reference to the state of the art, there has been long felt need for a method for decoding and analyzing PCIe protocol data at Gen1, Gen2, Gen3, Gen4, Gen5, or Gen6 data rates in real time without the need for using expensive custom PCIe PHY chip.

An objective of the present disclosure is to disclose a scalable architecture for protocol analyser for PCIe protocols from Gen1 to Gen6 using high speed Field Programmable Gate Arrays (FPGA).

Another objective of the present disclosure is to provide an architecture which automatically decodes the PCIe line rate change and reconfigures the transceivers to decode PCIe data at any of the data rates from Gen1 to Gen6.

Yet another objective of the present disclosure is to provide an architecture which is scalable to support PCIe interface link widths of x1, x2, x4, x8 and x16 wherein the number after the x indicates the number of lanes in which data is transmitted.

It is an aim of the present disclosure to disclose a protocol analyser for decoding and analyzing PCIe communication signals between a host node and a device node, wherein the communication is routed through an interposer for tapping the signals for supplying to the protocol analyser. The protocol analyser comprising: at least a pair of high data rate 1:3 fanout buffers, the inputs of which are communicatively connected to the interposer for receiving the tapped signals for obtaining a first, a second, and a third copy of the tapped signals; a first, a second, and a third transceiver, communicatively connected to the at least one pair of high data rate 1:3 fanout buffers, configured for sampling the first, the second, and the third copies of the tapped signals respectively; a link training and status state machine decoder configured for detecting a speed or a change in speed in the PCIe signals, and based on the detected speed, selecting one of a first, second or a third sampled copies of the tapped signals, for protocol decoding and analysing; and a protocol analyser logic block configured for analysing one of the first, the second, and the third sampled copies of the tapped signals conforming to one or more generations of PCIe protocols.

To further clarify advantages and features of the present disclosure, a more particular description of the invention will be rendered by reference to specific 15 embodiments thereof, which is illustrated in the appended figures. It is to be appreciated that these figures depict only typical embodiments of the invention and are therefore not to be considered limiting of its scope. The invention will be described and explained with additional specificity and detail with the accompanying figures.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

Figure 1:
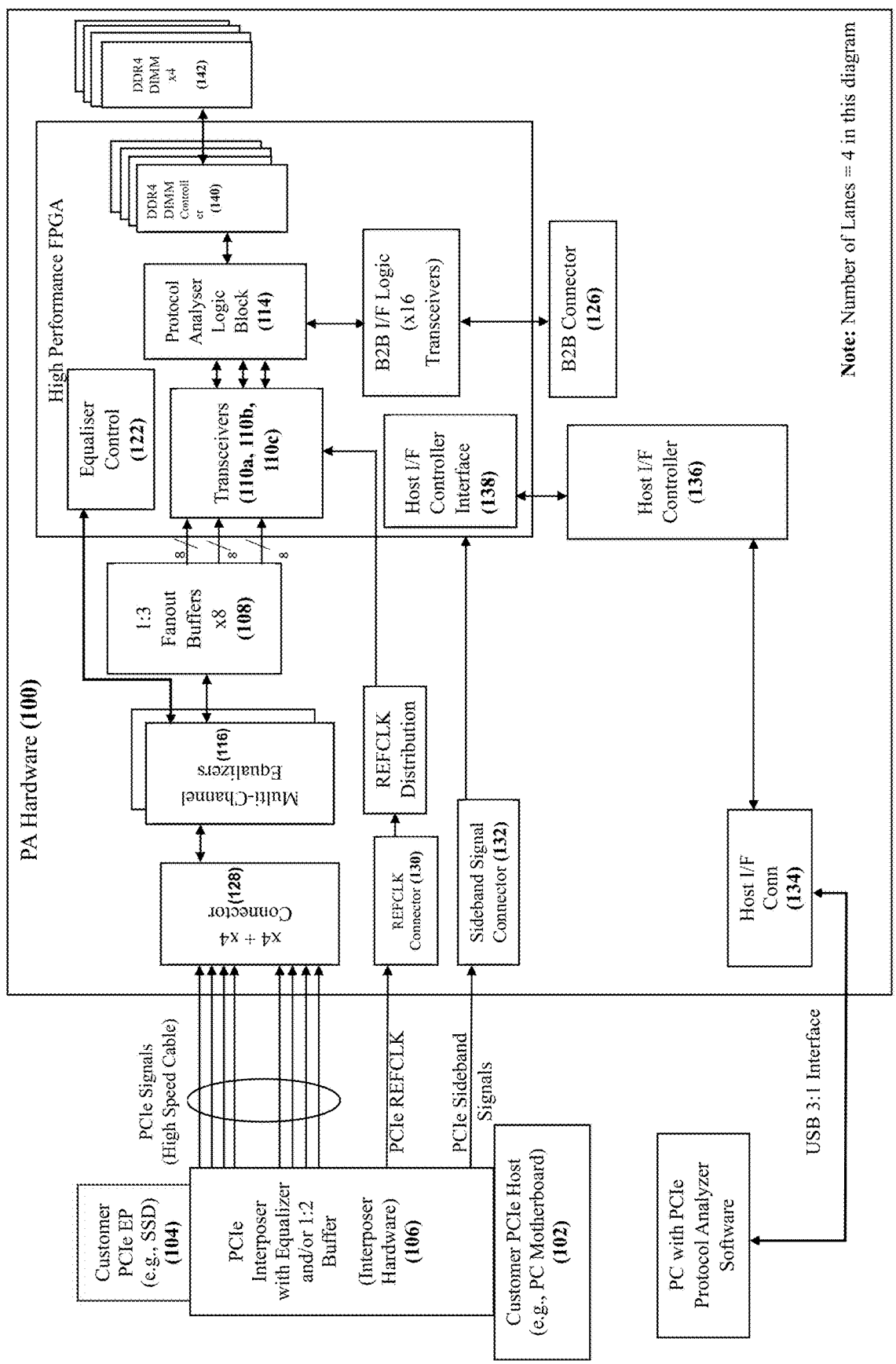
FIG. 1 illustrates a block diagram of a PCIe protocol analyser in accordance with an embodiment of the present disclosure.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises ... a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosure will be described below in detail with reference to the accompanying figures.

In addition to the illustrative aspects, exemplary embodiments, and features described above, further aspects, exemplary embodiments of the present disclosure will become apparent by reference to the drawings and the following detailed description.

Thus, with reference to the state of the art, there has been a long felt need for employing a method to decode and analyze PCIe protocol data at Gen1, Gen2, Gen3, Gen4, Gen5 and Gen6 data rates in real time without the need to use highly expensive PCIe custom PHY chip.

To overcome the problems of the state of the art, the present disclosure provides an architecture for a Peripheral Component Interconnect Express (PCIe) protocol analyser. In particular, disclosed is a PCIe protocol analyser realized by using, among other things, high speed Field Programmable Gate Arrays (FPGAs).

In one embodiment of the present disclosure, a protocol analyser is provided for decoding and analysing PCIe communication signals between a host node and a device node, wherein the communication is routed through an interposer for tapping the signals for supplying to the protocol analyser. The protocol analyser comprising: at least a pair of high data rate 1:3 fanout buffers, the inputs of which are communicatively connected to the interposer for receiving the tapped signals for obtaining a first, a second, and a third copy of the tapped signals; a first, a second, and a third transceiver, inputs of each of which are communicatively connected to the at least one pair of high data rate 1:3 fanout buffers, configured for sampling the first, the second, and the third copies of the tapped signals respectively; a link training and status state machine decoder configured for detecting a speed or a change in speed in the PCIe signals, and based on the detected speed, selecting one of a first, second or a third sampled copies of the tapped signals, for protocol decoding and analysing; and a protocol analyser logic block configured for analysing one of the first, the second or the third copies of the tapped signals conforming to one or more generations of PCIe protocols.

FIG. 1 illustrates a block diagram of the disclosed PCIe protocol analyser 100 in accordance with an embodiment of the present disclosure. As shown, the PCIe protocol analyser 100 is communicatively connected to an interposer 106 for the purpose of protocol analysis of the signal communicating between a host 102 and an end point 104.

The protocol analyser 100 may be realized for decoding and analysing PCIe communication signals between a host node 102 and a device node 104. In one aspect of the present disclosure, the host node 102 may be motherboard, for example, and the device node 104 may be one of a graphics card, a memory, an audio card, for example. In another aspect, the data flow between the host node 102 and device node 104 is bidirectional. Herein, the term "customer" refers to a user of the disclosed protocol analyser. In one aspect, the communication is routed through the interposer 106 for tapping the signals for supplying to the protocol analyser 100. In one aspect, the interposer 106 may be any suitable hardware which could be used as an electrical interface for routing communications signals between a host and a device and the signals may be tapped for further processing as disclosed herein.

The protocol analyser 100 comprises at least a pair of high data rate 1:3 fanout buffers 108, a first transceiver 110a, a second transceiver 110b, a third transceiver 110c, a link training and status state machine (LTSSM) decoder 112, a protocol analyser logic block 114, multi-channel equalizers 116, a transceiver rate control module 118, a first "first in, first out" (FIFO) memory 120a, a second FIFO memory 120b, a third FIFO memory 120c, an equalizer controller 122, a data selection module 124, and board to board connector 126, etc.

The functioning of the disclosed PCIe Gen6 protocol analyser 100 will be described below.

Initially, PCIe signals between PCIe host 102 and PCIe EP 104 are tapped by the interposer 106 and fed to PA 100. In one exemplary aspect, the inputs of at least a pair of high data rate 1:3 fanout buffers 108 are communicatively connected to the interposer 106 for receiving the tapped signals for obtaining a first, a second, and a third copy of the tapped signals.

Further, PCIe interface reference clock and PCIe sideband signals are tapped in the interposer 106 and fed to PA 100. As PCIe signals from interposer 106 are fed to PA 100 using high speed cables, the signal integrity at the PA 100 input might be poor due to the interposer and the tracks or cables from the interposer, for example, and this needs to be compensated. Multi-channel equalizer 116 are used to restore the signal integrity. The output signals of the equalisers are fed to the inputs of the of the high data rate 1:3 fanout buffers.

Then, a first, a second, and a third transceiver 110a, 110b, and 110c are communicatively connected to the at least one pair of high data rate 1:3 fanout buffers, configured for sampling the first, the second, and the third copies of the tapped signals respectively. For example, high speed transceivers in the Field Programmable Gate Arrays (FPGA) are used to sample PCIe signals at 2.5 GT/s, 5 GT/s, 8 GT/s, 16 GT/s, 32 GT/s and 64 GT/s rates. In an exemplary aspect, the first transceiver 110a is configured for sampling a first copy of the PCIe signals conforming to Gen1 and Gen2 protocols, the second transceiver 110b is configured for sampling a second copy of the PCIe signals conforming to Gen3, Gen4, and Gen5 protocols, and the third transceiver 110c is configured for sampling a third copy of the PCIe signals conforming to Gen6 protocol.

Further, the first, the second, and the third copies of the tapped signals are stored in corresponding first, second, and third FIFO memories 120a, 120b, 120c to be read out using a common clock for further processing.

Further, a link training and status state machine decoder 112 is configured for detecting a speed or a change in speed in the PCIe signals, and based on the detected speed, selecting one of a first, second or a third sampled copies of the tapped signals, for protocol decoding and analysing.

The protocol analyser logic block 114 is configured for analysing one of the first, the second or the third sampled copies of the tapped signals conforming to one or more generations of PCIe protocols. In another aspect, the link training and status state machine decoder is configured for implementing link training and status state machine (LT-SSM) decoder logic on PCIe downstream and upstream received data to track link width and number of links of PCIe interface and speed change.

In an aspect, the protocol analyser 100 comprises a transceiver rate control module 118 that is used to configure the first and the second transceivers 110a and 110b with a correct data rate depending on the speed change in PCIe signals detected by the link training and status state machine decoder.

In yet another aspect, an equalizer controller 122 communicatively connected to the multi-channel equalizer, controls the equalization parameters of the multi-channel equalizer for optimising the quality of output signals from the multi-channel equalizer.

In yet another aspect, one of Gen1 and Gen2 data output from the first transceiver, one of Gen3, Gen4, and Gen5 data output from the second transceiver, and Gen6 data output from the third transceiver are processed simultaneously to avoid data loss during speed change of PCIe interface and discard invalid data based on the interface speed information from the link training and status state machine decoder.

In one aspect, there are two parallel processing paths-one for one of Gen1 and Gen2 data processing and second one for one of Gen3, Gen4, and Gen5 data processing. They can be used only for decoding and analysing PCIe communication signals between a host node 102 and a device node 104 for the data rates from Gen1 to Gen5. All processing is done in pipelined architecture to enable real time decoding of PCIe signals.

In another aspect, the protocol analyser 100 is configured to stream the packetized PCIe data to a computer for further processing.

In another aspect, a data selection module 124 is configured for selecting data from one of Gen1 and Gen2 data path, Gen3, Gen4, and Gen5 data path, and Gen6 data path based on current data rate information from the link training and status state machine decoder.

Figure 2A:
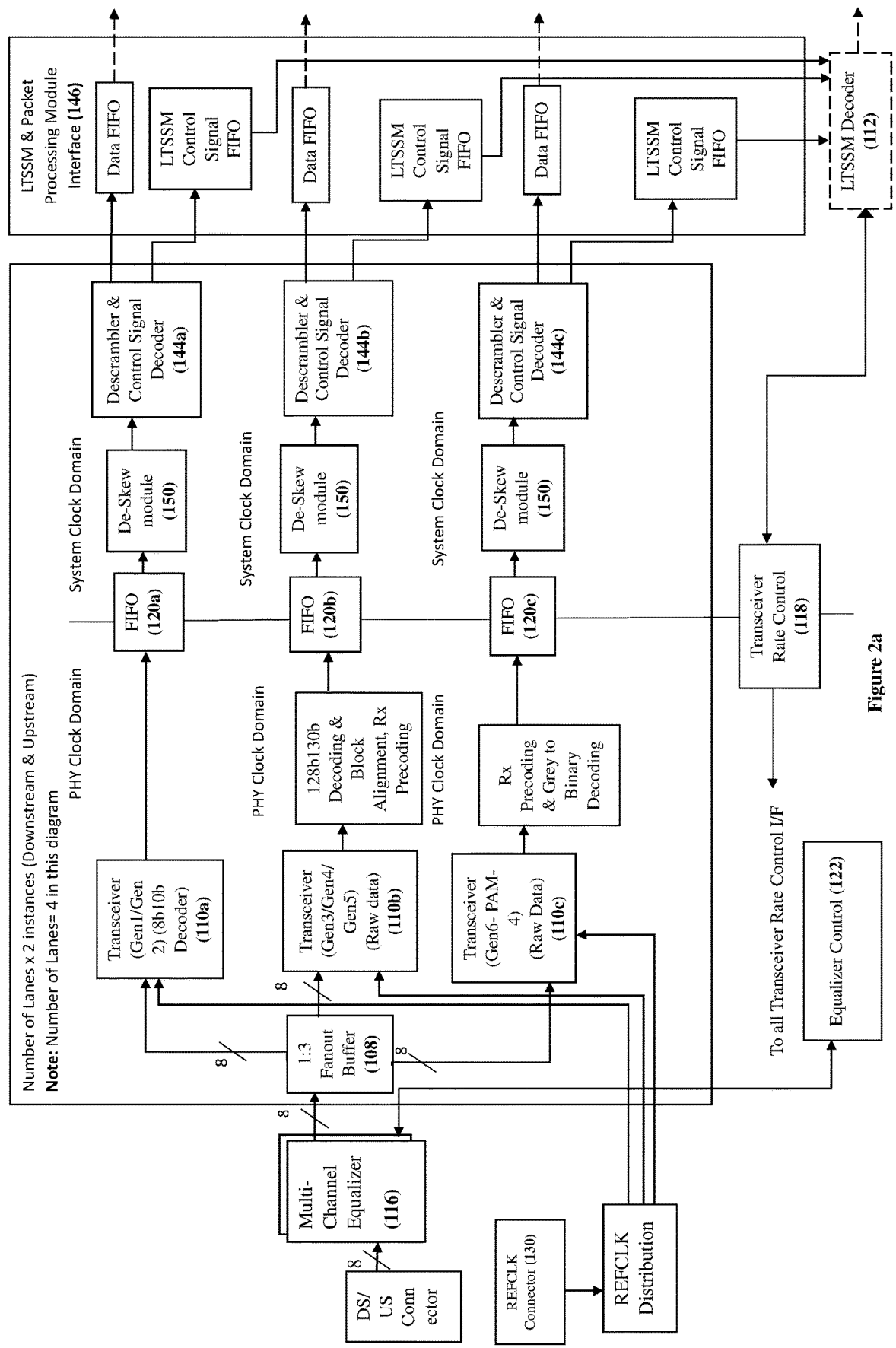
FIGS. 2a and 2b illustrate a detailed data flow of the PCIe protocol analyser as explained in FIG. 1 in accordance with an embodiment of the present disclosure.
Figure 2B:
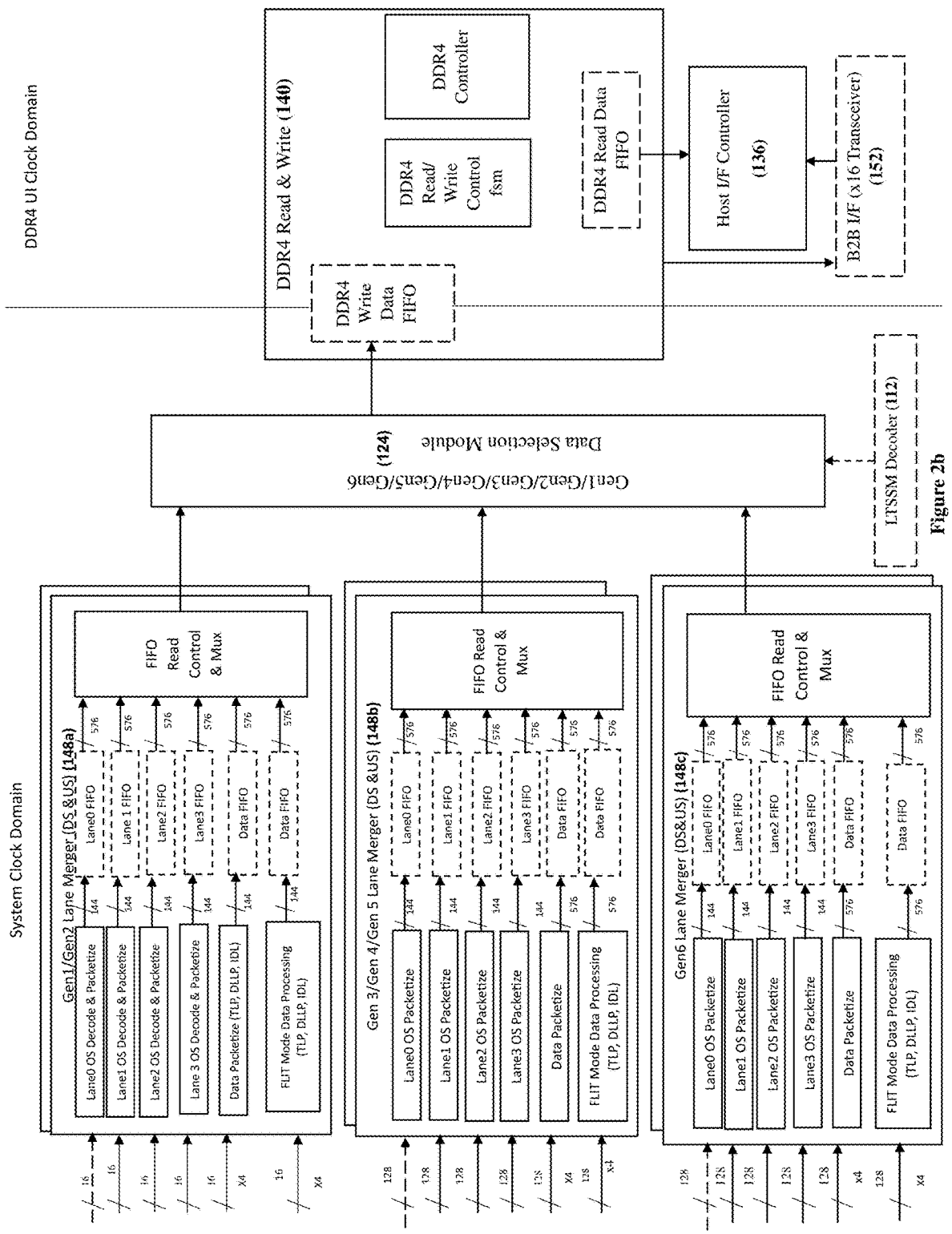

FIGS. 2a and 2b illustrate a detailed data flow of the PCIe protocol analyser as explained in FIG. 1 in accordance with an embodiment of the present disclosure.

There are three parallel processing paths, first one for one of Gen1 and Gen2 data processing, second one for one of Gen3, Gen4, and Gen5 data processing and third one for Gen6 data processing. All processing is done in pipelined architecture to enable real time decoding of PCIe signals.

In the initial step of the method, multi-channel equalizers 116 are used to compensate for the losses incurred on PCIe signals at the PA 100 input as these signals are coming from interposer 106 to PA 100 over high-speed cables.

In the next step, equalizer control module 122 controls the equalization parameters of multi-channel equalizers 116 to optimise their performance thereby making available substantially restored PCIe signals to the PA 106.

In the next step, high data rate 1:3 fanout buffers 108 are used on each PCIe signals to create 3 copies of each PCIe signal.

In the next step, all three outputs of high data rate 1:3 fanout buffers 108 are fed to high-speed transceivers in the FPGA. One set of transceivers 110a are configured for processing signals at Gen1 data rate of 2.5 GT/s. These transceivers 110a are reconfigured for processing signals at Gen2 data rate of 5 GT/s if the interface switches to Gen2 data rate during link initialization. 8b10b decoding logic inside transceivers are enabled at Gen1 and Gen2 data rates. Another set of transceivers 110b are configured for processing signals at Gen3 data rate of 8 GT/s. These transceivers 110b are reconfigured for processing signals at Gen4 data rate of 16 GT/s and processing signals at Gen5 data rate of 32 GT/s if the interface switches to Gen4 or Gen5 speed during link initialization. Another set of transceivers 110c are configured for processing signals at Gen6 data rate 64 GT/s and PAM-4 encoding. In an aspect, data outputs from each transceiver 110a, 110b, 110c are taken out parallelly with respect to recovered clock from Clock and Data Recovery (CDR) circuitry inside transceiver 110a, 110b, 110c.

In the next step, Gen1/Gen2 transceiver output is stored in asynchronous FIFOs 120a, 120b, 120c to convert to a common clock domain. Each lane's data comes with respect to that lane's recovered clock and is written to asynchronous FIFO with respect to corresponding recovered clock. All lane's FIFOs are read for further processing with respect to system clock.

In the next step, outputs of Gen3, Gen4, or Gen5 transceiver is fed to 128130b Decoding and Block Alignment, Rx precoding logic. If precoding is enabled, Rx precoding is done after 128b130b decoding and block alignment operation is completed. Transceiver output of each lane data is processed with corresponding lane's recovered clock. 128130b decoding and block alignment, Rx precoding logic output is stored in asynchronous FIFOs to convert to a common clock domain. Each lane's data comes with respect to that lane's recovered clock and is written to asynchronous FIFO with respect to corresponding recovered clock. All lane's FIFOs are read for further processing with respect to system clock.

Gen6 transceiver output is fed to Rx precoding and Grey to binary decoding logic. Transceiver output of each lane data is processed with corresponding lane's recovered clock. Rx precoding and Grey to binary decoding logic output is stored in asynchronous FIFOs to convert to a common clock domain. Each lane's data comes with respect to that lane's recovered clock and is written to asynchronous FIFO with respect to corresponding recovered clock. All lane's FIFOs are read for further processing with respect system clock.

In the next step, data read from asynchronous FIFO is given to corresponding De-skew module 150 for Gen1 or Gen2 data, Gen3, Gen4, or Gen5 data, and Gen6 data. De-skew module 150 does lane to lane de-skewing as per PCIe specification for data rates of Gen1, Gen2, Gen3, Gen4, Gen5, Gen6.

In the next step, the descrambler and control signal decoder module 144*a*, 144*b*, and 144*c* do the following functions:

Descrambler logic does de-scrambling of PCIe data as per PCIe specification for data rates of Gen1 and Gen2 and Gen3, Gen4, Gen5, and Gen6.

Control signal decode logic generates control signals such as TS1/TS2 detection, EIOS detection, EIEOS detection, SKP ordered set detection etc., for use in Link Training and Status State Machine decoder logic.

Descrambler and control signal decoder module outputs are written to corresponding Data FIFOs and LTSSM control signal FIFOs.

In the next step, LTSSM decoder 112 implements Link Training and Status State Machine decoder logic on PCIe downstream and upstream received data to track link width and number of links and speed change of PCIe interface. This decoder 112 decides whether Gen1, Gen2 path or Gen3, Gen4, and Gen5 path or Gen6 path data to be processed further for protocol decoding. This decoder 112 generates the required signals for the transceiver rate control module.

In the next step, the transceiver rate control module 118 reconfigures high-speed transceivers with the correct data rates depending on PCIe interface speed change based on input from LTSSM decoder. Gen1, Gen2 Transceiver 110*a* is configured for either Gen1 or Gen2 data rate. Gen3, Gen4, and Gen5 Transceiver 110*b* is configured for Gen3, Gen4 or Gen5 data rates. Gen6 Transceiver 110*c* is always configured for Gen6 data rate of 64 GT/s PAM-4 signalling.

In the next step, Gen1, Gen2 lane merger module 148*a* decodes and packetizes PCIe Gen1, Gen2 data.

Lane 0/1/2/3 OS decode and packetize module decodes ordered sets OS and packetize as per Prodigy's proprietary packet structure to be sent to PCIe PA software later.

Lane 0/1/2/3 FIFOs are used to convert data widths from 144 bits to 576 bits for temporary storage.

Data packetize module merges data from all PCIe lanes, decodes transaction layer packets (TLP), data link layer packets (DLLP) and idles (IDL) and packetize as per Prodigy's proprietary packet structure to be sent to PCIe PA software later.

Flit mode data processing module merges data from all PCIe lanes and processes the flits if flit mode operation is enabled.

Data FIFO is used to convert data widths from 144 bits to 576 bits for temporary storage.

FIFO read control and Mux module reads data from Lane 0/1/2/3 FIFO and data FIFO in a round-robin fashion and sends to Gen1, Gen2, Gen3, Gen4, Gen5, and Gen6 data selection logic to be written to DDR4SDRAM memory later Gen3, Gen4, or Gen5 Lane Merger module (148*b*) decodes and packetizes PCIe Gen3, Gen4, or Gen5 data.

Lane 0/1/2/3 OS Packetize module packetize ordered sets (OS) as per Prodigy's proprietary packet structure to be sent to PCIe PA software later.

Lane 0/1/2/3 FIFOs are used to convert data widths from 144 bits to 576 bits for temporary storage.

Data packetize module merges data from all PCIe lanes and packetizes as per Hardware-Software interface packet structure to be sent to PCIe PA software later.

Flit mode data processing module merges data from all PCIe lanes and processes the flits if flit mode operation is enabled.

Data FIFO is used for temporary storage.

FIFO read control and Mux module reads data from Lane 0/1/2/3 FIFO and Data FIFO in a round-robin fashion and sends to Gen1/Gen2/Gen3/Gen4/Gen5/Gen6 Data Selection logic to be written to DDR4SDRAM memory later.

Gen6 lane merger module 148*c* decodes and packetizes PCIe Gen6 data.

Lane 0/1/2/3 OS Packetize module Packetize Ordered Sets OS as per Prodigy's proprietary packet structure to be sent to PCIe PA software later.

Lane 0/1/2/3 FIFOs are used to convert data widths from 144 bits to 576 bits for temporary storage.

Data packetize module merges data from all PCIe lanes and packetizes as per Prodigy's proprietary packet structure to be sent to PCIe PA software later.

Flit mode data processing module merges data from all PCIe lanes and processes the flits if flit mode operation is enabled.

Data FIFO is used for temporary storage.

FIFO read control and Mux module reads data from Lane 0/1/2/3 FIFO and Data FIFO in a round-robin fashion and sends to Gen1/Gen2/Gen3/Gen4/Gen5/Gen6 Data Selection logic to be written to DDR4SDRAM memory later.

In the next step, Gen1/Gen2/Gen3/Gen4/Gen5/Gen6 data selection module (124) multiplexes data from Gen1/Gen2 path, Gen3/Gen4/Gen5 data path and Gen6 data path based current data rate information from LTSSM decoder.

In the next step, DDR4 Read and Write logic (140) implements DDR4 write and read functionality.

DDR4 Write Data FIFO buffers data from Gen1/Gen2/Gen3/Gen4/Gen5/Gen6 Data Selection module before writing to DDR4SDRAM memory.

DDR4 Controller is the DDR4SDRAM Memory Controller IP available in FPGA to interface with DDR4SDRAM DIMM module. 4 DDR4 Controllers are used to interface with 4 DDR4SDRAM DIMM modules of 64 GB each. DDR4SDRAM is accessed at 1200 MHz (2400 Mbps) data rate to match PCIe interface data rate requirements.

DDR4 Read/Write control Finite State Machine module implements the state machine to interface with DDR4 Controller Module to Write and Read data to/from DDR4SDRAM DIMM module. Write operation is prioritized over read operation as data acquired from PCIe interface should not be lost at any cost. Read can be done slowly as the read data will be sent to PCIe PA Software for further processing.

DDR4 read data FIFO buffers data read from DDR4SDRAM DIMM module before it is processed by host interface (I/F) controller module.

In the next step, host I/F Controller module 136 reads data from DDR4 read Data FIFO (and board-to-board (B2B) I/F module 152 in case of 2 'PA' stack up for DDR4SDRAM DIMM memory expansion or higher link width support) and sends to host I/F controller chip (USB3.1 Device Controller) which in turn sends data to PCIe PA Software running on host PC.

In the next step, B2B I/F module implements communication between two protocol analysers in case of two protocol analysers stack up for DDR4SDRAM memory expansion or higher link width support. 16 pairs of transceivers (16 Transmit and 16 Receive) are currently used to implement this logic. Each transceiver runs at 16 Gbps data rate.

In one embodiment, two parallel processing paths, first one for one of Gen1 and Gen2 data processing, and second one for one of Gen3, Gen4, and Gen5 data processing could be used in case of the protocol analyser 100 can be used only for decoding and analysing PCIe communication signals between a host node 102 and a device node 104 for the data rates starting from Gen1 to Gen5. All processing is done in pipelined architecture to enable real time decoding of PCIe signals.

In the next step, the PCIe Gen6 protocol analyser is configured to stream the packetized PCIe data to software running on host computer for further processing.

The salient features of the present disclosure are the method of using high data rate 1:3 fanout buffer chips to create 3 copies of PCIe signals, use of separate high-speed transceivers to sample all these copies of data simultaneously, implementation of LTSSM decoder logic to detect speed change and decide which transceiver data is to be processed further and implementation of a fully pipelined FPGA Register-transfer level (RTL) logic to analyse one of Gen1 and Gen2, one of Gen3, Gen4, and Gen5, and Gen6 PCIe signals separately.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

REFERENCE NUMERALS

Protocol analyser/PA—100
Host node—102
Device node—104
interposer—106
Fanout buffers—108
First transceiver—110a
Second transceiver—110b
Third transceiver—110c
Link training and status state machine decoder—112
Protocol analyser logic block—114
Multi-channel equalizers—116
Transceiver rate control module—118
First FIFO memory—120a
Second FIFO memory—120b
Third FIFO memory—120c
Equalizer controller—122
Data selection module—124
Board to board connector—126
Connector—128
REFCLK connector—130
Sideband signal connector—132
Host I/F Connector—134
Host I/F Controller—136
Host I/F Controller Interface—138
DDR4 DIMM Controller—140
DDR4 DIMM—142
First descrambler and control signal decoder—144a
Second descrambler and control signal decoder—144b
Third descrambler and control signal decoder—144c
LTSSM and Packet processing module interface—146
Gen1/Gen2 Lane Merger module—148a
Gen1/Gen4/Gen5 Merger module—148b
Gen6 Merger module—148c
De-skew module—150
Board-to-board (B2B) I/F module—152

We claim:

1. A protocol analyser for decoding and analysing PCIe communication signals between a host node and a device node, wherein the communication signals are routed through an interposer for tapping the communication signals for supplying to the protocol analyser, the protocol analyser comprising:
   at least a pair of high data rate 1:3 fanout buffers, inputs of which are communicatively connected to the interposer for receiving the tapped communication signals for obtaining a first, a second, and a third copies of the tapped communication signals;
   a first, a second, and a third transceivers, communicatively connected to the at least one pair of high data rate 1:3 fanout buffers, configured for sampling the first, the second, and the third copies of the tapped communication signals respectively;
   a link training and status state machine decoder configured for detecting a speed or a change in speed in the PCIe communication signals, and based on the detected speed, selecting one of a first, a second, or a third sampled copies of the tapped communication signals, for protocol decoding and analysing; and
   a protocol analyser logic block configured for analysing one of the first, the second, or the third sampled copies of the tapped communication signals conforming to one or more generations of PCIe protocols.

2. The protocol analyser of claim 1, wherein the tapped communication signals are compensated for losses in signal integrity by communicatively connecting the tapped communication signals to one or more multi-channel equalizers, and wherein an output of the one or more multi-channel equalizers are communicatively coupled to the inputs of the at least a pair of high data rate 1:3 fanout buffers.

3. The protocol analyser of as claimed in claim 1, wherein the first transceiver is configured for sampling a first copy of the PCIe communication signals conforming to Gen1 and Gen2 protocols, the second transceiver is configured for sampling a second copy of the PCIe communication signals conforming to Gen3, Gen4 and Gen5 protocols, and the third transceiver is configured for sampling a third copy of the PCIe communication signals conforming to Gen6 protocol.

4. The protocol analyser of claim 1, wherein the protocol analyser comprises a transceiver rate control module for configuring the first and the second transceivers with a correct data rate depending on the change of in PCIe communication signals detected by the link training and status state machine decoder.

5. The protocol analyser of claim 1, wherein the first, the second, and the third sampled copies of the tapped communication signals are stored in a corresponding first, second, and third FIFO memories to be read out using a common clock for further processing.

6. The protocol analyser of claim 2, wherein an equalizer controller communicatively connected to the one or more multi-channel equalizers controls the equalization parameters of the one or more multi-channel equalizers for optimising the quality of output signals from the one or more multi-channel equalizers.

7. The protocol analyser of claim 1, wherein the link training and status state machine decoder is configured for implementing link training and status state machine decoder logic on PCIe downstream and upstream received data to track a link width, a number of links of PCIe interface, and a speed change of the PCIe interface.

8. The protocol analyser of claim 1, wherein one of Gen1 and Gen2 data output from the first transceiver, one of Gen3, Gen4, and Gen5 data output from the second transceiver, and Gen6 data output from the third transceiver are processed simultaneously to avoid data loss during a speed change of PCIe interface and discard invalid data based on PCIe interface speed information from the link training and status state machine decoder.

9. The protocol analyser of claim 1, wherein the protocol analyser comprises a data selection module configured for selecting data from one of Gen1 data path, Gen2 data path, Gen3 data path, Gen4 data path, Gen5 data path, and Gen6 data path based on current data rate information from the link training and status state machine decoder.

10. The protocol analyser of claim 1, wherein a functionality of the protocol analyser is limited up to Gen5 data rate by removing the third transceiver and the corresponding processing path modules from the protocol analyser logic block and using a low-density Field Programmable Gate Arrays (FPGA).

11. The protocol analyser of claim 1, wherein a maximum link width support, a storage bandwidth, and a storage depth is increased by stacking two protocol analysers as claimed in claim 1, using board to board interface logic and board to board connector.

* * * * *